Jan. 14, 1958

E. E. CHATTERTON 2,819,765

COMPOUND POWER PLANT

Filed Aug. 14, 1952

Inventor
Ernest E. Chatterton

By Watson Cole,
Grindle & Watson
Attorneys

Jan. 14, 1958     E. E. CHATTERTON     2,819,765
COMPOUND POWER PLANT

Filed Aug. 14, 1952     3 Sheets-Sheet 3

Inventor
Ernest E. Chatterton
By Watson, Cole,
Grindle & Watson
Attorneys

United States Patent Office 2,819,765
Patented Jan. 14, 1958

2,819,765
COMPOUND POWER PLANT

Ernest Edward Chatterton, London, England, assignor to D. Napier & Son Limited, London, England, a company of Great Britain Application August 14, 1952, Serial No. 304,236

9 Claims. (Cl. 170—135.74)

This invention relates to compound power plants or units of the kind comprising a reciprocating internal combustion engine, usually of the compression ignition liquid fuel injection type, and a turbine arranged to be driven by the exhaust gases from the reciprocating engine and having its rotor directly connected to the rotor of a compressor arranged to deliver a gaseous charge (that is to say air in the case of a compression ignition engine), to the internal combustion engine.

A wide variety of power plants of the above kind have been proposed including arrangements in which the unit comprised by the turbine and the compressor driven by it is connected to a power output shaft independent from the power output shaft driven by the crankshaft or crankshafts of the internal combustion engine so as to utilise any surplus power which the turbine may deliver over that necessary to drive the compressor, and arrangements in which the rotors of the turbine-compressor unit are directly mechanically connected through a gear train to the crankshaft or crankshafts of the internal combustion engine.

Prior proposals in which the turbine-compressor unit was directly connected by transmission gearing to the crankshaft or crankshafts of the reciprocating engine suffer from the disadvantage that for every speed of the complete assembly there is a definite corresponding speed for the turbine compressor unit and the maximum gaseous charge which can be obtained from the compressor is thus entirely dependent on the speed of the reciprocating engine. Thus the speed-power curve of the complete plant is inflexible and is unsuited to many applications, while moreover the same speed range has to be accepted both for the reciprocating engine and for the turbine-compressor unit whereas the characteristics of these two parts of the complete plant are entirely different.

Power plants of the alternative known kind in which the compressor-turbine assembly is independent of the reciprocating internal combustion engine and drives a separate power output shaft provide greater flexibility since both the instantaneous speed and the speed range of the compressor-turbine assembly is independent of that of the reciprocating engine. With this type of power plant, however, the obtaining of the required characteristics in the compressor and turbine and the internal combustion engine so that these match with one another over the required range of operating conditions and the control of the various values to give a required speed-power curve and to divide the total power output appropriately between the separate output shafts driven respectively by the reciprocating engine and the compressor-turbine unit presents a considerable problem. Moreover, with this type of power plant, there is a definite limitation of the size of compressor which can be driven, this being limited at each running condition by the energy which is available in the engine exhaust gases and converted into useful power at the turbine. If it is required to utilise a compressor of greater capacity than can be driven by the turbine power alone for example to enable a required boost pressure to be maintained up to a specified altitude in the case of an aircraft engine, it may be necessary to provide an additional compressor driven direct from the internal combustion engine, this leading to increased complexity of construction and increased difficulties in matching the characteristics of the individual components and the control thereof, to give efficient operation over the whole range of operation of the power unit. When such an engine is applied to aircraft propulsion the difficulties referred to above make it essential that the two output shafts drive separate variable pitch propellers having separate speed controls so that the additional problem of maintaining propeller efficiency and satisfactory operation of two propellers over a wide range of relative propeller speeds and pitches also arises.

Moreover neither of the prior proposed arrangements is suited to the propulsion of watercraft without a variable pitch propeller or propellers to enable the power absorbed by the propeller or propellers over the whole speed range to conform to the speed-power curve which the engine can meet and such variable-pitch propellers not only add to the complication of an installation and the difficulty of replacement if a propeller is damaged but at present cannot provide such a high efficiency as a constant pitch propeller over the speed range usually requied.

The object of the present invention is to provide an improved power plant of the general kind referred to which will enable the power curve of the plant as a whole to conform to a larger variety of requirements than the previous arrangements while at the same time avoiding the complexity of construction and control necessarily associated with the prior arrangement in which the compressor-turbine unit was independent of the reciprocating engine.

A power plant according to the present invention comprises a reciprocating internal combustion engine, preferably of the compression ignition type, a turbine arranged to be driven by the exhaust gas from the reciprocating engine and having its rotor directly connected to the rotor of a compressor arranged to deliver the gaseous charge to the reciprocating engine, and variable ratio transmission mechanism connecting the crankshaft or crankshafts of the reciprocating engine to the turbine and compressor rotors and of the kind in which for each setting of apparatus controlling the transmission ratio, a definite predetermined transmission ratio is established between the crankshaft or crankshafts and the turbine and compressor rotors.

Generally the turbine and compressor rotors would be coaxial and be directly connected to one another through suitable shafting or the equivalent but the turbine and compressor rotors might be arranged otherwise than coaxially and be directly connected through suitable constant ratio transmission gearing.

In any case the variable ratio transmission mechanism connecting the crankshaft or crankshafts of the reciprocating engine to the turbine and compressor rotors is preferably of the infinitely variable type, that is to say of the the type in which any desired transmission ratio can be established within a predetermined range of ratios.

With a power plant according to the invention it will be seen that the pressure of the gaseous charge supplied to the reciprocating engine by the compressor (usually termed the boost pressure) can be controlled at any given crankshaft speed by varying the transmission ratio of the variable ratio transmission gearing and that this allows for great flexibility in the relationship between the crankshaft speed and boost. If at any operating condition selected, the power demanded by the compressor is greater than that available from the turbine at that condition the connection with the crankshaft through the variable ratio transmission gearing enables the additional power required to be taken from the internal combustion engine. Hence the compressor running conditions at any point in the engine operating range are not determined by the turbine power available. This again allows greater flexibility in operation.

In one convenient application of the invention, therefore, the power plant may include boost-pressure-controlling apparatus comprising a pressure-responsive device responsive to the boost pressure, and mechanism controlled by this pressure responsive device for varying the ratio of the variable ratio transmission apparatus in such manner as to maintain the boost pressure substantially constant for any given setting of the boost pressure controlling apparatus. When such a power plant is used in aircraft the boost pressure controlling apparatus can be arranged automatically to vary the ratio of the power transmission apparatus to maintain a selected boost with changes in altitude while moreover by varying the transmission ratio a comparatively wide range of boost pressures for any given engine speed can be obtained.

Thus by suitable control of the variable ratio transmission gearing, coupled with suitable control of the fuel supply to the reciprocating engine a power plant according to the invention can be given a wide variety of speed-torque curves to suit a wide variety of operating conditions.

Thus the invention is also especially applicable to power plants for the propulsion of watercraft where in many instances such a power plant can have a speed-torque curve suitably matched to the corresponding curve of a constant pitch propeller over the whole speed range. Thus in one application of the invention the power plant is arranged to drive a constant pitch propeller for the propulsion of watercraft, the reciprocating engine being of the compression ignition liquid injection type and usually having a variable datum speed control governor controlling the fuel supply to the engine; and the control for varying the fuel supply to the engine, as by varying the governor setting and that for varying the ratio of the variable transmission gearing are so interconnected or are arranged to be operated in such relationship to one another as to provide an engine speed torque curve which is so related to the speed torque curve of the propeller that the maximum torque obtainable from the engine exceeds the torque absorbed by the propeller over the whole working speed range.

The compressor may be of various types, for example of the axial flow type, or of the combined axial and radial flow type, while similarly the variable ratio transmission mechanism may be of various types, although a preferred type is that described in United States specification No. 2,222,281. The accompanying drawings show by way of example the general form which a power unit, according to the invention, may take and two forms of control apparatus which may be used according to the invention in association with such a power unit. In the drawings.

Figure 1:
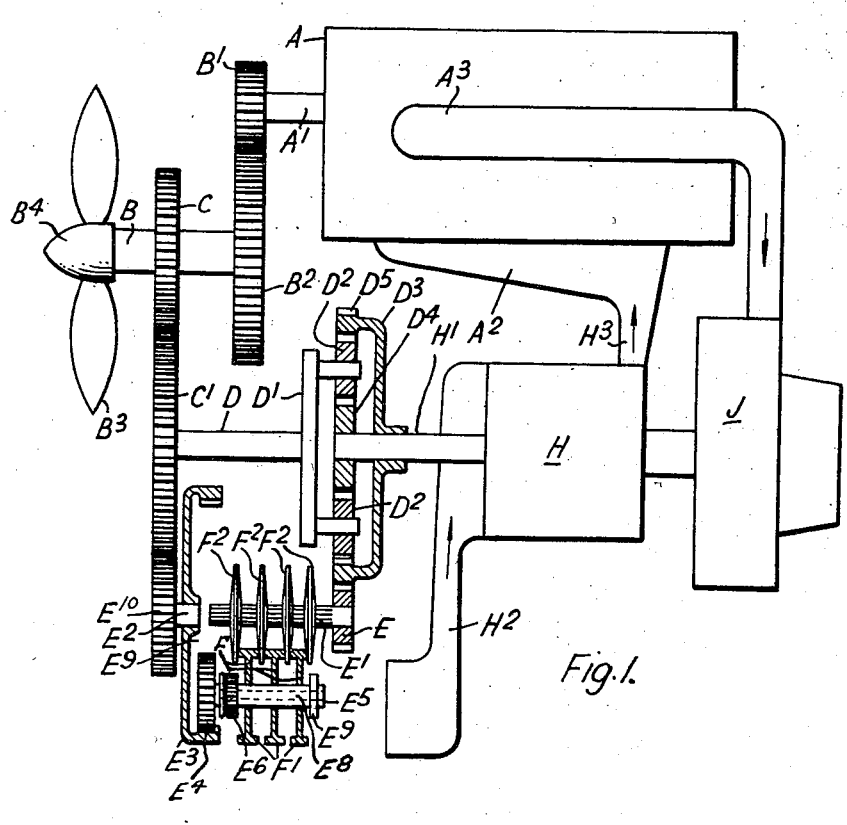
Figure 1 is a diagrammatic side elevation partly in section showing the general lay-out of a form of power unit according to the invention.

The power unit shown in Figure 1 comprises a reciprocating internal combustion engine indicated at A, having a crankshaft $A^1$ arranged to drive a propeller shaft B through gearing $B^1$ and $B^2$, the propeller shaft carrying a propeller $B^3$. The pitch of the propeller blades can be adjusted so as to control the speed of the engine by means of pitch control mechanism $B^4$ arranged in the hub of the propeller.

The propeller shaft B is also connected through gearing C, $C^1$ to a shaft D carrying a spider $D^1$ on which are rotatably mounted the planet wheels $D^2$ of differential gearing including an internally toothed ring $D^3$ and a sunwheel $D^4$ engaged by the planet wheels. The internally toothed ring $D^3$ also has external teeth $D^5$ which mesh with a gearwheel E on one of the main shafts $E^1$ of a friction type transmission gear of the infinitely variable ratio type, the other main shaft $E^2$ of which carries an internally toothed ring $E^3$ meshing with three planetary gearwheels $E^4$ each carried by a shaft $E^5$. The shaft $E^2$ is connected by a gearwheel $E^{10}$ to the gearwheel $C^1$ while each of the shafts $E^5$ is connected by gearwheels $E^6$, $E^7$ to a lay-shaft $E^8$ supported in a frame $E^9$ mounted to rock about the axis of its associated shaft $E^5$.

Each of the layshafts $E^8$, carried by the frames $E^9$ has mounted thereon a series of friction discs F having rim portions $F^1$ which lie between and make frictional engagement with the faces of friction discs $F^2$ on the main shaft $E^1$. The discs F and $F^2$ can slide but not rotate on their respective shafts $E^8$ and $E^1$ and it will be seen that by swinging the lay-shafts $E^8$ simultaneously inwards, and outwards so that they approach or recede from the axis of the main shaft $E^1$ the ratio of transmission as between the layshaft $E^8$ and the main shaft $E^1$ and hence between the main shaft $E^2$ and the main shaft $E^1$ can be varied. To ensure such simultaneous swinging movement the swinging frames $E^9$ are connected by links G while one of them carries an operating lever $G^1$ by which, therefore, all three frames $E^9$ can be caused to swing inwards or outwards simultaneously.

The construction and operation of the infinitely variable ratio transmission gearing is well-known and is described and illustrated for example in United States specification No. 2,222,281 and will not therefore be further described.

It will thus be seen that by varying the ratio of the variable ratio transmission gearing the ratio of transmission as between the shaft D and the gearwheel $D^4$ and hence as between the crankshaft $A^1$ and the gearwheel $D^4$ can be varied.

The gearwheel $D^4$ is connected to the shaft $H^1$ of an axial flow compressor H arranged to draw air through an inlet $H^2$ from the atmosphere and deliver it through an outlet $H^3$ to the induction manifold $A^2$ of the engine A, the rotor of this compressor H being directly connected to the rotor of a turbine J arranged to be driven by the exhaust gases received from the exhaust passage $A^3$ of the engine A.

Figure 3:
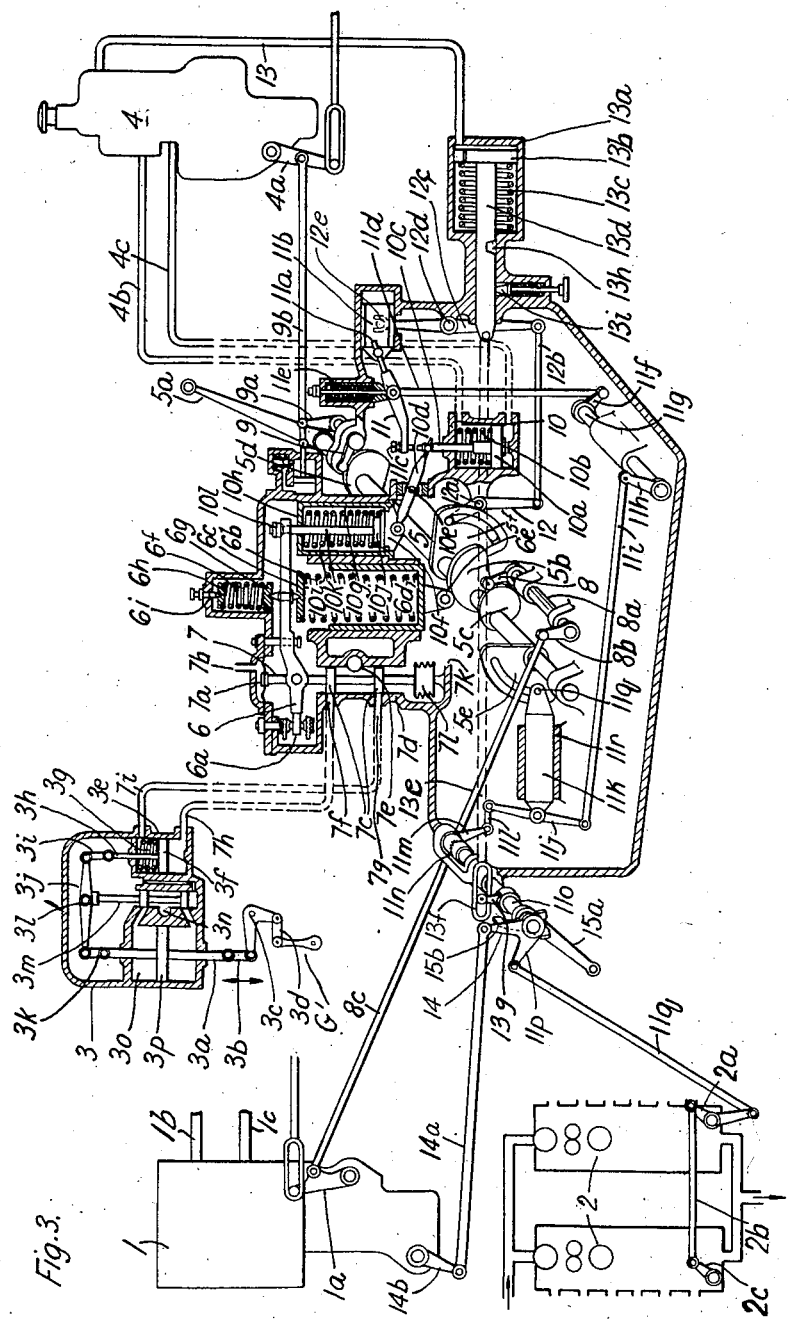
Figure 3 is a diagrammatic view of one form of control mechanism which may be associated with a power unit as shown in Figure 1 when applied to aircraft propulsion.

In the form of the invention embodying control apparatus as shown in Figure 3 the propeller $B^3$ is of the usual variable pitch constant speed type. The propeller pitch control mechanism is actuated hydraulically from fluid conduits $1^b$ and $1^c$ associated with a governor 1 responsive to engine speed and functioning in known manner at any given setting to control the propeller pitch so as to maintain a constant engine speed, while the engine A is of the compression ignition type the power output of which is controlled by varying the quantity of fuel injected per cycle by fuel injection pumps.

In Figure 3 the constant speed governor of the propeller $B^3$ is shown at 1 while the control by which its speed setting and hence the speed which it will maintain is varied as shown at $1a$. The fuel injection pumps of the engine A are shown at 2 with the control lever by which the quantity of fuel injected thereby per cycle is controlled shown as two levers $2a$ and $2c$ coupled by a rod $2b$.

The control apparatus includes a servo unit generally indicated at 3 the output member $3a$ of which is in the form of a piston rod and, for the purpose of illustration, is connected by a link $3b$, a bell crank lever $3c$ and a further link $3d$ to the lever $G^1$ so as to control the transmission ratio of the variable ratio transmission mechanism. In addition the apparatus includes a speed responsive governor device 4 driven by the turbine compressor assembly H, J and serving, in a manner hereinafter described, to determine the maximum speed at which the turbine compressor assembly can be driven at each operating condition of the power unit.

The part of the apparatus by which the power output of the power unit is controlled comprises a master control shaft 5 having an operating lever 5a which is moved to the left in Figure 3 to increase the power output and to the right to reduce such power output. Rigidly mounted upon the master control shaft 5 is a series of cams, including a cam 5b (hereinafter called the boost setting cam) which acts on mechanism for determining the supercharging pressure (commonly called the boost pressure) which it is desired to maintain, an engine-speed-setting cam 5c which controls the setting of the governor 1 and hence the speed at which the internal combustion engine will be maintained, a maximum-turbine-speed-control cam 5d by which the maximum turbine speed at any setting of the master control shaft is determined, a fuel pump control cam 5e by which the setting of the fuel pump control mechanism 2a, 2b, 2c is controlled, and a cam 5f which, in a manner hereinafter described serves to carry, in accordance with the setting of the master control shaft 5, the law relating reductions in fuel pump delivery to reductions in boost with rises in altitude above the critical altitude.

The boost control mechanism comprises a lever 6 pivoted at one end at 6a, in a manner which may permit some longitudinal adjustment of the pivot point, and acted upon at an intermediate point in its length by two opposed springs, comprising respectively a principal spring 6b which acts at one end through a thrust member 6c on the lever and at its other end on an adjustable abutment member 6d arranged to slide within a cylindrical housing and carrying at its lower end a roller 6e engaging the cam 5b, and a subsidiary spring 6f which acts at one end on the lever 6 through a thrust member 6g and at its other end on an abutment 6h which is normally fixed but is adjustable by means of an adjusting screw 6i.

Pivoted to the lever 6 between the fulcrum point 6a and the point at which the springs 6b and 6f act thereon is a rod 7 one end of which is connected to a diaphragm 7a the upper face of which is subject to boost pressure through a pipe 7b communicating with the induction manifold $A^2$. The rod 7 forms part of a servo control valve comprising two lands 7c operating within a cylinder 7d into which a hydraulic pressure supply port 7e opens at a point between the lands. The lands are arranged normally to cover inlet and outlet ports 7f and 7g communicating through passages 7h and 7i with the opposite ends of a cylinder 3e forming part of the unit 3. The lower end of the rod 7 is connected to a fixed part 7k by a flexible evacuated bellows or diaphragm 7l having the same effective face area as the diaphragm 7a, the under face of the diaphragm 7a and the bellows 7b both being subject to atmospheric pressure so that the forces applied to the rod 7 due to atmospheric pressure counterbalance one another.

The cylinder 3e of the device 3 contains a piston 3f acted upon by a light spring 3g and connected by a piston rod 3h and a link 3i to one end of a floating lever 3j the other end of which is connected by a link 3k to the upper end of the rod 3a while an intermediate point in its length is connected at 3l to a servo valve 3m. The servo valve 3m controls in known manner the supply of hydraulic liquid from a port 3n to and the escape of hydraulic liquid from the two ends of a cylinder 3o in which operates a servo piston 3p on the rod 3a.

The operation of the boost control mechanism so far described is as follows: At any setting of the master control shaft 5 the spring 6b will apply a predetermined force to the lever 6, this force being partly counterbalanced by the spring 6f and partly by the boost pressure supplied through the pipe 7b and acting on the diaphragm 7a. Under stable conditions the forces thus acting on the lever 6 will balance one another with the lever 6 in such a position that the two ports 7f and 7g are maintained closed by the valve 7c and the parts of the servo unit 3 thus remain stationary. Assuming now that, due say to a rise in altitude, the boost pressure falls, the lever 6 will rise so as to open the port 7f to the supply of hydraulic fluid under pressure and the port 7g to exhaust. The piston 3f will thus be caused to rise and will thus lift the servo valve 3m to permit hydraulic fluid under pressure to pass to the upper end of the cylinder 3o and to permit escape of hydraulic fluid from the lower end of this cylinder. The servo piston 3p will therefore move downwards and will act through the rod 3a, and the lever and linkage connection operated thereby, on the lever $G^1$ to raise the gear ratio of the variable ratio transmission mechanism and thus cause an increase in the speed of the turbine compressor unit to restore the boost pressure. It will be apparent that as soon as the required boost pressure has been restored the valve 7c will close and stable conditions will therefore be re-established. On an increase in boost pressure above the datum set by the master control shaft 5 the opposite operation will occur to effect an appropriate reduction in the ratio of the variable ratio transmission mechanism to restore the boost to the required datum.

The mechanism by which the cam 5c controls the governor 1 to vary the engine speed comprises in the example diagrammatically shown a follower 8 in the form of a lever the end of which engages the cam 5c, this lever being mounted upon a shaft 8a carrying also a lever 8b which is connected by a link 8c to the control lever 1a of the constant speed governor 1.

The apparatus by which the cam 5d controls the maximum speed of the turbine compressor assembly at any given setting of the master control shaft 5 comprises a follower in the form of a lever 9 mounted upon a shaft carrying a second lever 9a which is connected by a link 9b to a lever 4a which, in known manner, alters the force of the spring of the governor 4 so as to vary the point in the speed of the turbine compressor assembly at which this governor becomes effective. The governor 4 is of the type commonly used for speed control which operates a valve controlling the flow of hydraulic fluid through two pipes 4b, 4c in such manner that when a speed which is determined by the setting of the control lever 4a is exceeded the governor admits hydraulic fluid under pressure to the pipe 4c and escape of hydraulic fluid from the pipe 4b, while it connects the pipe 4b to the source of hydraulic fluid under pressure and permits escape of fluid from the pipe 4c at speeds below the determined speed.

The pipes 4b and 4c lead to the opposite ends of a servo cylinder 10 containing a piston 10a acted upon by a light spring 10b and coupled by a piston rod 10c at one end of a lever 10d which is fulcrumed at 10e and acts at its opposite end on the lower end 10f of a tubular member 10g. The upper end 10h of the tubular member 10g acts as an abutment for the upper end of a spring 10i the lower end of which acts on a thrust member 10j which is mounted on the lower end of a rod 10k capable of sliding through the upper end 10h of the tubular thrust member 10g and passing through the adjacent end of the lever 6. The upper end of the rod 10k carries a head 10l which normally lies just clear of a seating on the upper face of the lever 6 so that the head 10l does not normally act on the lever 6.

The operation of the apparatus the setting of which is thus controlled by the cam 5d is as follows: For each setting of the master control shaft 5 it will be apparent that the control lever 4a will be moved into a corresponding position. This position will determine the point in the speed range of the turbine compressor assembly at which the governor 4 will cause hydraulic fluid to be delivered under pressure to the under side of the piston 10a. With increases in altitude of an aircraft to which the power plant is fitted up to the critical altitude for any setting of the master control shaft 5, the boost set by the cam 5b will be maintained in the manner described above by automatic changes in the ratio of the variable ratio transmission mechanism to cause increases in speed of the turbine compressor assembly. When, however, the maximum permissible speed of that assembly as determined by the cam 5d at the particular setting of the master control shaft is reached, a further fall in boost and hence a slight increase in the speed of the turbine compressor assembly will cause the governor 4 to permit hydraulic fluid under pressure to be delivered to the under side of the piston 10a. This piston will thus move upwards and thus cause the abutment member 10f, 10g, 10h to move downwards so that the spring 10i will be free to move the rod 10k with its head 10l downwards, whereby the lever 6 is subject to the action of the spring 10i in the same direction as the boost pressure in the pipe 7b acts on this lever. It will be apparent that in this way at altitudes above the critical altitude for any setting of the master control shaft 5 the lever 6 will thus be maintained in a position in which the valve 7c prevents any further increase in the gear ratio by the device 3. The apparatus controlled by the governor 4 may thus be regarded as applying to the lever 6 through the spring 10i a force which corresponds precisely to the degree to which the actual boost is below the set boost due to the fact that the maximum permissible turbine compresser speed for the particular operating conditions has been reached and the critical altitude exceeded. Thus below critical altitudes the lever 6 is maintained in its balanced position with the ports 7f and 7g closed by maintenance of the boost pressure, while above critical altitudes the force applied by the boost pressure is supplemented by the force of the spring 10i.

It will be apparent that as boost pressure drops above critical altitude, means must be provided for reducing the quantity of fuel injected to ensure that excessive fuel shall not be delivered. It is nevertheless desirable to enable the set fuel injection to be maintained over a comparatively small range of drop in boost pressure below the set boost, that is to say for some enrichening of the fuel air ratio to occur before the apparatus for reducing the quantity of fuel with reductions in boost comes into operation. The apparatus for effecting this comprises a lever 11 one end of which is fulcrumed at 11a in an adjustable fulcrum piece 11b while its other end is provided with an abutment 11c, which is preferably adjustable, and which under normal conditions is slightly spaced above the upper end of the rod 10c. An intermediate point in the lever 11 is pivotally connected to a rod 11d acted upon by a spring 11e and pivoted at its lower end to a lever 11f on a shaft 11g. The shaft 11g also carries a lever 11h which is connected by a link 11i to one end of a lever 11j. The lever 11j is pivoted to an adjustable fulcrum piece 11k and is connected at its other end by a link 11l to a lever 11m. The lever 11m is connected by a spring loaded clutch device 11n to a shaft 11o carrying at its end a lever 11p which is connected by a link 11q to the control mechanism 2a, 2b, 2c of the fuel pumps. The fulcrum piece 11k is mounted to slide in a housing 11r and carries a pin 11q at one end which is acted upon by the cam 5e so that rotation of the master control shaft 5 causes movement of the fulcrum piece 11k in its housing.

It will thus be apparent that, normally, movement of the master control shaft 5 moves the fulcrum piece 11k and thus acts through the lever 11j to rock the shaft 11o and thus control the setting of the fuel pumps 2 in accordance with the position of the master control shaft 5, the pivotal connection between the rod 11i and the lever 11j acting as a fixed fulcrum point of the lever 11j under these conditions. It will also be apparent that in addition the shaft 11o can be rocked to control the setting of the fuel pumps 2 by movement of the lever 11 acting through the parts 11d, 11f, 11g, 11h and 11i.

As long as the piston 10a occupies the position shown, in which it is maintained under all conditions below critical altitude, the lever 11 is maintained in the position shown under the action of the spring 11e. Moreover for a predetermined reduction in boost and hence movement of the piston 10a above critical altitude, the extent of this reduction being determined by the gap between the piston rod 10c and the abutment 11c, the lever 11 will also remain in the position shown. For further reductions in boost, however, beyond this predetermined reduction, which may be of the order of 6½%, the piston rod 10c engages the abutment member 11c and thus moves the lever 11 and acts through the mechanism 11d, 11f, 11g, 11h and 11i to rock the lever 11j about its pivotal connection to the fulcrum piece 11k and thus effect a reduction in the quantity of fuel delivered by the fuel pumps 2.

The ratio between the reduction in boost and the reduction to be made in the quantity of fuel delivered by the fuel pumps under the above conditions will vary with different settings of the master control shaft 5, and the mechanism for controlling this ratio if operated by the cam 5f. This mechanism comprises a lever 12 pivoted at 12a and acted upon at its upper end by the cam 5f while its lower end is connected to one end of a link 12b the other end of which is connected to a lever 12c pivoted at 12d. The upper end of the lever 12c acts through a suitable fork and trunnion connection indicated at 12e on the fulcrum piece 11b so as to cause it to slide within its housing, the pivotal connection between this fulcrum piece and the lever 11 comprising a pivot pin on which the end of the lever 11 can slide in a generally known manner. It will thus be apparent that with movement of the master control shaft 5 the fulcrum piece 11b will be caused to move so as to vary the effective length of the lever 11 and hence the movement imparted to the rod 11d for any given movement of the abutment member 11c by the rod 10c.

The valve of the governor 4 is so constructed that if, due to some emergency or mechanical failure, the speed of the compressor turbine assembly rises by a predetermined amount above the set speed under condition, hydraulic fluid under pressure is admitted to a pipe 13 leading to one end of a cylinder 13a containing a piston 13b normally maintained in the position shown by a spring 13c. The piston 13b is connected by a piston rod 13d and a link 13e to a slotted member 13f engaged by a pin on the end of a lever 13g mounted on the shaft 11o. Normally the slotted member 13f permits free movement of the lever 13g therein so that the mechanism including the piston 13b is inoperative. If, however, for any reason the turbine compressor assembly over-speeds to the degree mentioned, hydraulic fluid admitted through the pipe 13 causes the piston 13b to move to the left so that the right hand end of the slotted member 13f comes up against the pin on the lever 13g and then moves the lever 13g to the left, thus rocking the shaft 11o to cause the fuel pumps 2 to be shut down, the force applied by the piston 13b to the shaft 11o being sufficient to override the spring of the spring-pressed clutch device 11n so that the teeth of this clutch device ride over one another. Moreover the lever 11p has formed integral therewith a second lever 14 which is connected by a link 14a to a control 14b on the governor 1 which under the above conditions and in the known manner overrides the normal operation of the governor and causes the propeller pitch control $B^4$ associated therewith to be moved into its maximum coarse pitch position, that is to say the pitch position suited to the condition in which the engine is inoperative. In order to ensure that the piston 13b will not again move to the right hand end of its cylinder as the turbine compressor speed falls off as the engine speed drops due to the fuel pumps being cut out, the piston rod 13d is provided with a notch 13h into which a spring-pressed catch member 13i moves under the action of the spring when the piston has moved to the left, thus preventing the return of the piston to its right hand end position until the catch member 13i is released manually.

Loosely mounted upon a shaft 11o is a lever 15a carrying a nose 15b which, when the lever 15a is moved in one direction, engages the lever 14 and by the application of sufficient force can then cause movement of the lever 14, and hence of the lever 11p, to shut down the fuel pumps and place the governor 1 in its maximum coarse pitch position, the lever 13g sliding in the link 13f during this operation while the clutch 11n is disengaged by the force applied to the lever 14.

Figure 4:
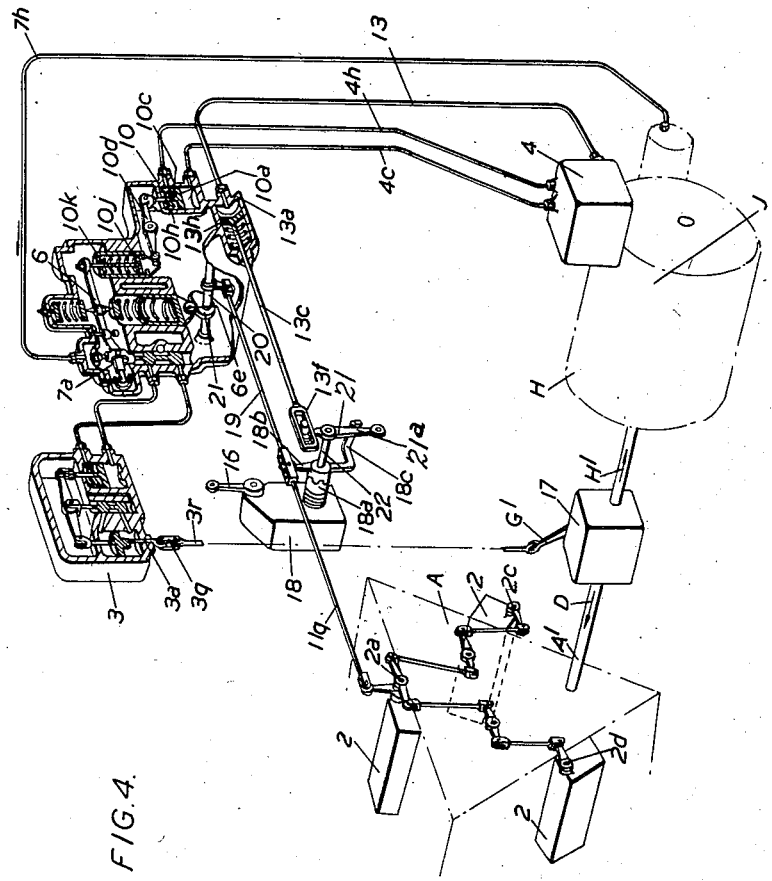
Figure 4 is a similar view to Figure 3 of control apparatus which may be associated with a power unit as shown in Figure 1 when applied to marine propulsion.

In the alternative arrangement diagrammatically shown in Figure 4, A represents the internal combustion engine of the compression ignition type as in the construction shown in Figure 1 the fuel supply to which is effected by fuel pumps 2, the control members 2a, 2c, 2d, of which are all connected by suitable levers and linkage as shown to a common control rod 11q. For the purpose of the diagram the internal combustion engine is shown as connected by a shaft $A^1$ through infinitely variable ratio transmission mechanism indicated generally at 17 to the air compressor and turbine assembly which in this figure are diagrammatically shown and indicated by the reference letters H and J so as to conform to Figures 1 and 2. In conformity with Figures 1 and 2 also the input and output shaft of the infinitely variable speed gear shown diagrammatically at 17 are indicated by the reference letters D and $H^1$.

Figure 2:
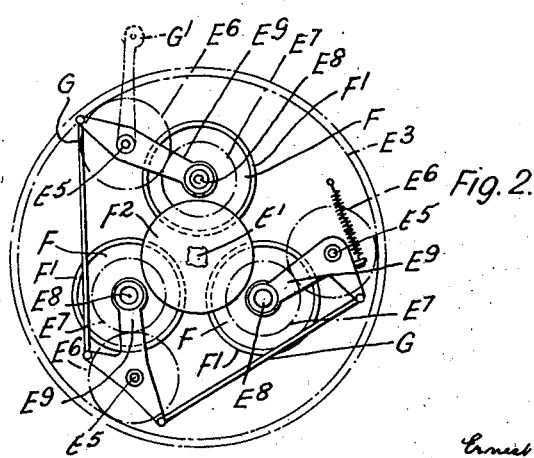
Figure 2 is a diagrammatic end view of the form of infinitely variable ratio transmission mechanism used in the power unit shown in Figure 1.

Moreover the control member $G^1$ of the infinitely variable speed gear 17 is indicated by the reference letter $G^1$ in Figure 4 so as to conform to Figures 1 and 2.

It will therefore be understood that the arrangement shown diagrammatically in Figure 4 is so shown for convenience only and that the internal combustion engine A is connected to the turbine compressor unit H, J through the variable ratio speed gear 17, the compressor supplying the combustion air to the internal combustion engine, while the turbine is driven by the exhaust gases from the engine, all as diagrammatically shown in Figures 1 and 2, while the relationship between the speeds of the crankshaft or crankshafts of the internal combustion engine and of the turbine compressor unit can thus be changed by control of the ratio of the variable transmission mechanism by means of the control member $G^1$.

In the arrangement shown in Figure 4 the power unit is controlled by a control lever 16 which controls the setting of a speed-responsive governor 18 of known type driven by the engine A and having an output shaft 18a which is connected by a lever 18b to the rod 11q so as to control the fuel injection pumps 2a in such a manner as to tend to maintain the speed of the engine A constant for any setting of the control lever 16.

The lever 18b is also connected to a rod 19 arranged to rock a camshaft 20 carrying a cam 21, hereinafter called a boost control cam. The boost control cam 21 acts upon the roller 6e the adjustable abutment member 6d of boost control apparatus which is identical in general form and operation to that shown in Figure 3 except that the capsule 7b is omitted since the apparatus does not have to deal with any great changes in atmospheric pressure due to altitude changes. The boost control apparatus, therefore, operates in the same manner as that shown in Figure 3 to control servo mechanism generally indicated at 3 having an output member 3a which in the construction shown in Figure 4 is connected through a link 3q and a rod 3r to the operating member $G^1$ of the variable ratio transmission mechanism.

Thus for every position of the lever 18b the cam 21 will have a predetermined position so that a predetermined boost will be maintained by a suitable control of the ratio of the variable ratio transmission mechanism 17.

In addition means are provided for preventing the turbine compressor unit H, J being driven at excessive speed due to unsuitably high gear ratio being established in the variable ratio transmission mechanism 17 under conditions in which the boost control mechanism might otherwise cause such a ratio to be established. This mechanism comprises a speed-responsive governor 4 corresponding to the governor 4 in the construction shown in Figure 3 responsive to the speed of the turbine and arranged to control the supply of hydraulic fluid under pressure to a cylinder 10 having a piston 10a and a spring 10b therein arranged and operating in the same manner as the corresponding parts in Figure 3 so as to prevent operation of the boost control apparatus to cause the driving of the turbo-compressor unit at excessive speeds under any conditions.

In addition the governor 4 is arranged so that if, due to some fault or failure, the turbine speed increases above some predetermined maximum somewhat higher than the normal permitted maximum, hydraulic fluid will be delivered through a pipe 13 to a cylinder 13a containing a piston 13b connected by a rod 13c and a lost motion connection 13f to a lever 21 upon a shaft 22 which is coaxial with the shaft 18a. The lever 21 has a part 21a which, when the lever moves in one direction, can make engagement with an extension 18c on the lever 18b and rock the lever 18b positively to shut down the internal combustion engine, this movement being permitted by reason of a spring clutch device interposed between the shaft 18a and the lever 18b and corresponding to the clutch device 11n.

It will thus be apparent that the operation of the piston 13b in Figure 4 is similar to that of the corresponding piston in Figure 1.

What I claim as my invention and desire to secure by Letters Patent is:

1. A compound power plant comprising in combination a reciprocating fuel injection type combustion ignition engine, a turbine arranged to be driven by the exhaust gases from the reciprocating engine, a rotary compressor arranged to deliver its gaseous charge to the reciprocating internal combustion engine, a direct mechanical connection between the rotors respectively of the turbine and the compressor, variable ratio transmission mechanism connecting the crankshaft of the internal combustion engine to the rotors of the turbine and compressor and of the kind in which for each setting of the ratio-controlling mechanism a definite transmission ratio is established between the crankshaft of the reciprocating engine and the turbine and compressor rotors, adjustable governor mechanism sensitive to the speed of rotation of the engine, and acting to control the speed thereof automatically by controlling the load thereon, adjustable fuel control means controlling the quantity of fuel delivered to the engine per cycle and master control mechanism operatively connected with said governor mechanism, fuel control means, and ratio controlling mechanism to control simultaneously the speed of the reciprocating engine, the quantity of fuel delivered to the engine per cycle and the transmission ratio of the transmission mechanism between the reciprocating engine crankshaft and the compressor and turbine rotors.

2. A power plant as claimed in claim 1 including a variable pitch propeller driven from the crankshaft of the reciprocating internal combustion engine and pitch control mechanism controlling the pitch of said propeller and in which the engine speed governor device is constituted by a variable datum constant speed governor acting on said propeller pitch control mechanism to control the pitch of the propeller.

3. A power plant as claimed in claim 2 including at least one fuel injection pump by which fuel is delivered to the reciprocating engine and in which the master control mechanism includes means for controlling the fuel injection pump so as to control the quantity of fuel delivered to the engine per cycle.

4. A power plant as claimed in claim 3 including fuel limiting mechanism associated with the governor device driven by the turbine, and operatively connected with the mechanism controlling the fuel pump to modify the setting thereof automatically, to reduce fuel delivery simultaneously with the operation of said maximum turbine speed control mechanism.

5. A compound power plant comprising in combination a reciprocating fuel injection type combustion ignition engine, a turbine arranged to be driven by the exhaust gases from the reciprocating engine, a rotary compressor arranged to deliver its gaseous charge to the reciprocating internal combustion engine, a direct mechanical connection between the rotors respectively of the turbine and the compressor, infiinitely variable ratio transmission mechanism connecting the crankshaft of the internal combustion engine to the rotors of the turbine and compressor and of the kind in which for each setting of the ratio-controlling mechanism a definite transmission ratio is established between the crankshaft of the reciprocating engine and the turbine and compressor rotors, adjustable governor mechanism sensitive to the speed of rotation of the engine, and acting to control the speed thereof automatically by controlling the load thereon, adjustable fuel control means controlling the quantity of fuel delivered to the engine per cycle and master control mechanism operatively connected with said governor mechanism, fuel control means, and ratio controlling mechanism to control simultaneously the speed of the reciprocating engine, the quantity of fuel delivered to the engine per cycle and the transmission ratio of the transmission mechanism between the reciprocating engine crankshaft and the compressor and turbine rotors.

6. A power plant as claimed in claim 5 including a variable pitch propeller driven from the crankshaft of the internal combustion engine and propeller pitch control mechanism controlling the pitch of said propeller and in which the engine governor mechanism is constituted by a variable datum constant speed governor acting on said propeller pitch control mechanism to control the pitch of the propeller.

7. A compound power plant comprising in combination a reciprocating fuel injection type combustion ignition engine, a turbine arranged to be driven by the exhaust gases from the reciprocating engine, a rotary compressor arranged to deliver its gaseous charge to the reciprocating internal combustion engine, a direct mechanical connection between the rotors respectively of the turbine and the compressor, infinitely variable ratio transmission mechanism connecting the crankshaft of the internal combustion engine to the rotors of the turbine and compressor and of the kind in which for each setting of the ratio-controlling mechanism a definite transmission ratio is established between the crankshaft of the reciprocating engine and the turbine and compressor rotors, variable datum boost control apparatus including a pressure responsive device responsive to the pressure in the induction passage of the reciprocating engine, servo mechanism controlled by said pressure responsive device and arranged to adjust the ratio of the transmission mechanism to maintain a predetermined pressure in said induction passage and datum setting apparatus by which the pressure to be maintained in said induction passage can be varied, adjustable governor mechanism sensitive to the speed of rotation of the engine, and acting to control the speed thereof automatically by controlling the load thereon, adjustable fuel control means controlling the quantity of fuel delivered to the engine per cycle and master control mechanism operatively connected with said governor mechanism, fuel control means, and boost datum setting apparatus to control simultaneously the speed of the reciprocating engine, the quantity of fuel delivered to the engine per cycle, and the setting of the datum setting apparatus.

8. A power plant as claimed in claim 7, including a speed responsive governor device driven by the turbine and maximum-turbine-speed control mechanism actuated by said governor device and operatively connected to the said servo mechanism controlled by the pressure responsive device to prevent further operation of the ratio controlling mechanism by said servo mechanism in a sense to increase the speed of the turbine when a predetermined turbine speed is reached.

9. A power plant as claimed in claim 8 in which the master control mechanism is operatively connected to said turbine governor device to control the speed setting thereof and hence the turbine speed at which said governor becomes effective to prevent the said further operation of the ratio controlling mechanism by the said servo mechanism.

References Cited in the file of this patent
UNITED STATES PATENTS

| | | |
|---|---|---|
| 2,346,587 | Kilchenmann | Apr. 11, 1944 |
| 2,400,306 | Hobbs | May 14, 1946 |
| 2,516,123 | Jorgensen et al. | July 25, 1950 |
| 2,556,190 | Jorgensen et al. | June 12, 1951 |
| 2,565,482 | Dolza et al. | Aug. 28, 1951 |
| 2,581,334 | Reggio | Jan. 1, 1952 |
| 2,583,537 | Alexanderson et al. | Jan. 29, 1952 |
| 2,656,675 | Coar | Oct. 27, 1953 |